(12) United States Patent
Yoon et al.

(10) Patent No.: US 9,871,664 B2
(45) Date of Patent: Jan. 16, 2018

(54) DISPLAY SECURING METHOD AND APPARATUS

(71) Applicant: SAMSUNG ELECTRONICS CO., LTD., Suwon-si (KR)

(72) Inventors: Seungkeun Yoon, Suwon-si (KR); Sang Joon Kim, Suwon-si (KR); Jongwook Lee, Suwon-si (KR); Changmok Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/681,162

(22) Filed: Apr. 8, 2015

(65) Prior Publication Data

US 2016/0112209 A1    Apr. 21, 2016

(30) Foreign Application Priority Data

Oct. 20, 2014 (KR) .................. 10-2014-0141577

(51) Int. Cl.
G09C 5/00 (2006.01)
H04L 9/32 (2006.01)
G06F 3/0488 (2013.01)
G06F 3/0484 (2013.01)

(52) U.S. Cl.
CPC .......... *H04L 9/3271* (2013.01); *G06F 3/0488* (2013.01); *G06F 3/04845* (2013.01); *G06F 3/04883* (2013.01); *G09C 5/00* (2013.01); *H04L 2209/24* (2013.01)

(58) Field of Classification Search
CPC ........ H04W 12/02; G06F 3/017; G06F 3/048; G06F 3/0484; G06F 3/04842; G06F 21/10; G06F 1/14; H04L 9/3297; H04L 63/0428

USPC .......................................................... 380/28
See application file for complete search history.

(56) References Cited

U.S. PATENT DOCUMENTS

| | | | |
|---|---|---|---|
| 2003/0133569 A1 | 7/2003 | Stern et al. | |
| 2008/0263445 A1* | 10/2008 | Park | G06F 3/0482 715/702 |
| 2010/0259560 A1* | 10/2010 | Jakobson | G06F 21/62 345/629 |
| 2011/0102369 A1* | 5/2011 | Thorn | G06F 3/04883 345/174 |
| 2011/0234629 A1 | 9/2011 | Kim et al. | |
| 2013/0100243 A1 | 4/2013 | Sorek | |
| 2013/0321452 A1* | 12/2013 | Kawalkar | G09G 3/20 345/629 |

(Continued)

FOREIGN PATENT DOCUMENTS

| | | |
|---|---|---|
| EP | 2 927 903 A1 | 10/2015 |
| JP | 2001-312657 A | 11/2001 |

(Continued)

OTHER PUBLICATIONS

Menezes, A. et al., "Chapter 1: Overview of Cryptography," Handbook of applied cryptography, CRC press, 1996 (50 pages).

(Continued)

*Primary Examiner* — Brian F Shaw
(74) *Attorney, Agent, or Firm* — NSIP Law

(57) ABSTRACT

A security apparatus includes an encryptor configured to visually encrypt a target object, and a decryptor configured to decrypt an area corresponding to a decryption gesture in the encrypted target object, during a predetermined period of time.

22 Claims, 24 Drawing Sheets

(56) References Cited

U.S. PATENT DOCUMENTS

| | | | | |
|---|---|---|---|---|
| 2015/0007351 A1* | 1/2015 | Janajri | ................... | H04L 63/04 |
| | | | | 726/30 |
| 2015/0287164 A1* | 10/2015 | Kominar | ............... | G06T 3/0093 |
| | | | | 345/647 |
| 2015/0356304 A1 | 12/2015 | You | | |
| 2015/0371613 A1* | 12/2015 | Patel | ....................... | G06F 21/10 |
| | | | | 345/549 |
| 2016/0188181 A1* | 6/2016 | Smith | ..................... | G06F 3/048 |
| | | | | 715/765 |

FOREIGN PATENT DOCUMENTS

| | | |
|---|---|---|
| JP | 2012-129701 A | 7/2012 |
| KR | 10-2008-0108722 A | 12/2008 |
| KR | 10-2010-0056209 A | 5/2010 |
| KR | 10-2014-0012269 A | 2/2014 |
| KR | 10-2014-0051202 A | 4/2014 |
| WO | WO 2014/119862 A1 | 8/2014 |

OTHER PUBLICATIONS

Extended European Search Report issued in counterpark European Application No. 15172008.3 dated Feb. 24, 2016 (10 pages).

* cited by examiner

DISPLAY SECURING METHOD AND APPARATUS

CROSS-REFERENCE TO RELATED APPLICATION

This application claims the benefit under 35 USC 119(a) of Korean Patent Application No. 10-2014-0141577, filed on Oct. 20, 2014, in the Korean Intellectual Property Office, the entire disclosure of which is incorporated herein by reference for all purposes.

BACKGROUND

1. Field

The following description relates to a display securing method and apparatus.

2. Description of Related Art

Development of information technology (IT) has brought about an increase in usage of terminal devices such as a smartphone, a tablet personal computer (PC), and the like. In a recent trend, the terminal device adopts an increased display size.

In a case in which the terminal device is utilized for business or directly used to process business transactions, critical information may be exposed. For example, according to an increase in a display size, information displayed on the terminal device may be easily exposed to others. The exposed information may cause an invasion of personal privacy of a user of the terminal device. Recently, research is continuously being conducted to enhance a security of the terminal device.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a security apparatus including an encryptor configured to visually encrypt a target object, and a decryptor configured to decrypt an area corresponding to a decryption gesture in the encrypted target object, during a predetermined period of time.

The encryptor may be configured to visually encrypt the target object based on an encryption gesture to the target object.

The encryptor may be configured to visually encrypt an area corresponding to the encryption gesture in the target object.

The encryptor may be configured to recognize, as the encryption gesture, any one or any combination of a touch gesture to an area in the target object, a sliding gesture to an area in the target object, and a drag gesture for setting a range of an area in the target object based on two touch gestures.

The encryptor may be configured to recognize, as the encryption gesture, the drag gesture, the sliding gesture, or the touch gesture simultaneously input with a touch gesture to a predetermined area on a display.

The encryptor may be configured to mix a noise object to the target object to visually encrypt the target object.

The encryptor may be configured to adjust a mixing ratio of the noise object to the target object based on a speed of an encryption gesture to the target object.

The encryptor may be configured to mix the noise object to the target object such that a presence of the target object is recognizable in the encrypted target object.

The encryptor may be configured to receive any one or any combination of an area to be visually encrypted in the target object, a noise object to be mixed to the target object, and a mixing ratio of the noise object to the target object.

The encryptor may be configured to overlay the target object with a noise object to visually encrypt the target object.

The encryptor may be configured to divide the target object into groups, and alternately display the groups to visually encrypt the target object.

The encryptor may be further configured to visually encrypt the area corresponding to the decryption gesture in response to the predetermined period of time elapsing.

The decryptor may be configured to receive either one or both of the predetermined period of time and a range of the area corresponding to the decryption gesture.

The decryptor may be configured to set the area corresponding to the decryption gesture as an entire area of the encrypted target object.

The decryptor may be configured to recognize, as the decryption gesture, any one or any combination of a gaze gesture into the area in the encrypted target object, a drag gesture for setting a range of the area in the encrypted target object based on two touch gestures, a sliding gesture to the area in the encrypted target object, and a touch gesture to the area in the encrypted target object.

The decryptor may be configured to recognize, as the decryption gesture, the gaze gesture, the drag gesture, the sliding gesture, or the touch gesture simultaneously input with a touch gesture to a predetermined area on a display.

The target object may include any one or any combination of an image, a text, and a video that are displayed on a display.

The encryptor may be configured to transmit the encrypted target object to another device, and the decryptor may be configured to receive the encrypted target object from the other device.

In another general aspect, there is provided a terminal device including an encryptor configured to visually encrypt a target object, and a transmitter configured to transmit the encrypted target object to another device. The encrypted target object is decrypted during a predetermined period of time, based on a decryption gesture.

In still another general aspect, there is provided a terminal device including a receiver configured to receive an encrypted target object from another device, and a decryptor configured to decrypt an area corresponding to a decryption gesture in the encrypted target object, during a predetermined period of time.

In yet another general aspect, there is provided a security method including visually encrypting an object displayed on a display based on an encryption gesture to the object, and decrypting the encrypted object based on a decryption gesture to the encrypted object.

The decrypting may include decrypting an area corresponding to the decryption gesture in the encrypted object, during a predetermined period of time.

The security method may further include visually encrypting the area corresponding to the decryption gesture in response to the predetermined period of time elapsing.

Other features and aspects will be apparent from the following detailed description, the drawings, and the claims.

Figure 1:
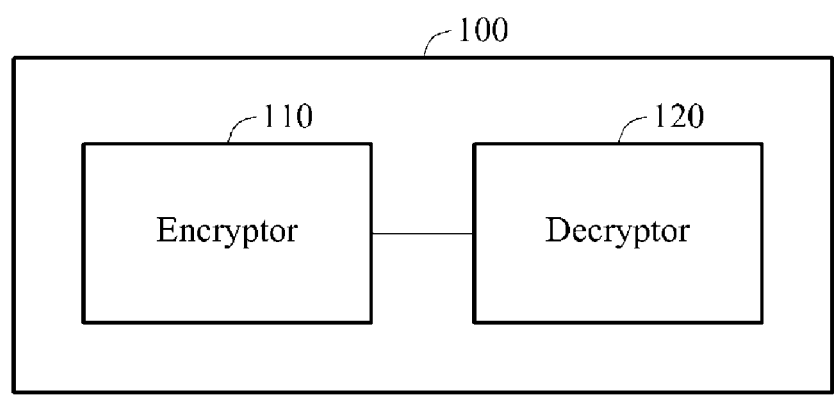
FIG. 1 is a block diagram illustrating an example of a security apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

FIG. 1 is a block diagram illustrating an example of a security apparatus 100. Referring to FIG. 1, the security apparatus 100 includes an encryptor 110 and a decryptor 120.

The encryptor 110 partially or fully visually encrypts a target object. In an example, the encryptor 110 may visually encrypt an entirety or a portion of the target object by mixing a noise object to the target object. In this example, an object may be any type of data displayed on a display. For example, the object may include at least one of an image, a text, and a video. The target object indicates a target to be encrypted by the encryptor 110. The noise object indicates an object mixed to the target object to encrypt the target object. The noise object may be an identical object to the target object, or a different object from the target object. The noise object may be selected by a user or determined in advance.

The encryptor 110 partially or fully visually encrypts the target object based on an encryption gesture input by the user to at least a portion of the target object. In this example, the encryption gesture may include a touch gesture corresponding to at least one area of the target object, a sliding gesture performed on at least one area of the target object, and a drag gesture for setting a range of at least one area in the target object based on two touch gestures. For example, the encryptor 110 may recognize a gesture of the user touching a predetermined area of the target object, using a finger, as the touch gesture. Also, the encryptor 110 may recognize a gesture of the user moving two fingers while the two fingers are in contact with a predetermined area of the target object, as the drag gesture.

Additionally, the encryption gesture may include the drag gesture, the sliding gesture, or the touch gesture simultaneously input with a touch gesture corresponding to a predetermined area on the display. For example, the encryptor 110 may recognize the drag gesture, the sliding gesture, and the touch gesture by the user on at least one area of the target object, using a finger while the finger is in contact with a predetermined area on the display, as the encryption gesture.

In an example, the encryptor 110 determines an area to be encrypted in the target object based on an area corresponding to the encryption gesture. For example, the encryptor 110 may determine a portion in contact with the finger of the user, of the target object on the display, as the area to be encrypted. Additionally, the encryptor 110 may determine a predetermined range from the portion in contact with the finger of the user, as the area to be encrypted. Also, the encryptor 110 may encrypt an entire area of the target object to which the encryption gesture is input.

In another example, the encryptor 110 adjusts a mixing ratio of a noise object to the target object based on a speed of the encryption gesture. For example, when the encryptor 110 recognizes a sliding gesture performed at a relatively high speed, a high mixing ratio of the noise object may be set for an area corresponding to the sliding gesture in the target object. Conversely, when the encryptor 110 recognizes a sliding gesture performed at a relatively low speed of the encryption gesture, the encryptor 110 may set a low mixing ratio of the noise object to an area corresponding to the sliding gesture in the target object.

Additionally, in an example, the encryptor 110 receives the mixing ratio of the noise object to the target object, the noise object, and/or the area to be encrypted in the target object, from the user through a predetermined interface. For example, the encryptor 110 may set an operation mode of the security apparatus 110 to an encryption mode by receiving a command from the user through an interface. As an example, in the encryption mode, the encryptor 110 may receive an input indicating whether the entire area of the target object or the area corresponding to the encryption gesture is to be set as the area to be encrypted, from the user through the interface. Also, the encryptor 110 may receive an input indicating whether the portion in contact with the finger of the user, or the range from the portion in contact with the finger of the user, is to be set as the area corresponding to the encryption gesture, from the user through the interface.

Also, in an example, the encryptor 110 may receive the command from the user through the interface, and set a mode of the security apparatus 110 to a normal mode. Despite an input of, for example, the touch gesture, the sliding gesture, and the drag gesture, the encryptor 110 may not recognize the input as the encryption gesture in the normal mode.

In another example, the encryptor 110 may overlay the entirety or the portion of the target object with the noise object to partially or fully visually encrypt the target object. Also, the encryptor 110 may divide the entirety or the portion of the target object into a plurality of groups, and encrypt the target object by alternately displaying objects included in the plurality of groups.

Also, the encryptor 110 may mix the noise object to the target object such that a presence of the target object is recognizable in the encrypted target object.

During a predetermined period of time, the decryptor 120 decrypts an area corresponding to a decryption gesture input by the user in the encrypted target object. The encryptor 110 visually encrypts the area corresponding to the decryption gesture when the predetermined period of time elapses. In this example, the predetermined period of time may be input from the user or set in advance. For example, when the predetermined period of time is set as 30 seconds, the decryptor 120 may decrypt the area corresponding to the decryption gesture in the encrypted target object for 30 seconds from a point in time at which the decryption gesture is input by the user. When a 30 second period elapses from the point in time, the encryptor 110 may visually encrypt the area corresponding to the decryption gesture. Through this, the decryptor 120 may allow a portion recognized by the user through a decryption to be encrypted again, thereby enhancing security.

The decryption gesture may include at least one of the touch gesture corresponding to at least one area of the encrypted target object, the sliding gesture performed on at least one area of the encrypted target object, the drag gesture for setting a range from at least one area of the encrypted target object based on two touch gestures, and a gaze gesture performed by gazing into at least one area of the encrypted target object. For example, when the user gazes at a predetermined area of the encrypted target object, the decryptor 120 may recognize the area at which the user gazes in the target object, by using a camera. The decryptor 120 may recognize the gaze gesture of the user as the decryption gesture, and recognize the area at which the user gazes as the area corresponding to the decryption gesture. Through this, the decryptor 120 may decrypt only a portion of the target object that is desired by the user, thereby enhancing security.

Additionally, the decryptor 120 may recognize the gaze gesture, the drag gesture, the sliding gesture, or the touch gesture simultaneously input with the touch gesture corresponding to a predetermined area on the display, as the decryption gesture. For example, the decryptor 120 may recognize the gaze gesture, the drag gesture, the sliding gesture, or the touch gesture performed while a finger of the user is in contact with a predetermined area on the display, as the decryption gesture.

Also, the decryptor 120 may receive an input including a time for performing a decryption or a range of the area corresponding to the decryption gesture, from the user through a predetermined interface. For example, the decryptor 120 may provide an interface for setting the range of the area corresponding to the decryption gesture, and set the range of the area corresponding to the decryption gesture such that the range corresponds to the input received through the interface.

In an example, the decryptor 120 may set the time for performing the decryption or the range of the area corresponding to the decryption gesture, based on the decryption gesture. For example, in a case in which the decryptor 120 recognizes a sliding gesture performed at a relatively high speed, the decryptor 120 may set the range of the area corresponding to the decryption gesture to be expanded twice, and set the time for performing the decryption to be prolonged twice when compared to a case in which the decryptor 120 recognizes a sliding gesture performed at a relatively low speed.

In an example, based on the area corresponding to the decryption gesture, the decryptor 120 may determine an area to be decrypted in the target object. For example, the decryptor 120 may determine a portion in contact with the finger of the user, of the target object on the display, as the area to be decrypted. Also, the decryptor 120 may determine a predetermined range from the portion in contact with the finger of the user as the area to be decrypted. For example, in a case in which an object represented by a plurality of lines on a display is displayed through an encryption, the decryptor 120 may decrypt all lines corresponding to a portion in contact with the finger of the user when the finger comes into contact with a left edge portion or a right edge portion of the display. As an example, when the user touches the left edge portion or the right edge portion of the display using a finger and moves the finger down, the decryptor 120 may decrypt all lines corresponding to a portion at which the user moves the finger down, and then the encryptor 110 may encrypt all lines corresponding to the portion in response to the finger being lifted off the touched portion. In this example, the decryptor 120 may move the object up on the display based on the lines corresponding to the portion. Also, when the user touches the left edge portion or the right edge portion of the display using the finger and moves the finger up, the decryptor 120 may decrypt all lines corresponding to a portion at which the user moves the finger up, and then the encryptor 110 may encrypt all lines corresponding to the portion in response to the finger being lifted off the touched portion. In this example, the decryptor 120 may move the object down on the display based on the lines corresponding to the portion.

Also, to decrypt an entire area of the encrypted target object, the decryptor 120 sets the area corresponding to the decryption gesture as the entire area. For example, when a gesture of touching the target object three times is set in advance as a gesture for decrypting the entire area of the target object, the decryptor 120 may decrypt the entire area of the target object in response to the gesture of touching the target object three times.

The encryptor 110 transmits the encrypted target object to an external source through a communication interface. The communication interface may include a wireless internet interface, for example, a wireless local area network (WLAN), a wireless fidelity (WiFi) direct, a digital living network appliance (DLNA), a wireless broadband (WiBro), a world interoperability for microwave access (WiMAX), a high speed downlink packet access (HSDPA), and a local area communication interface, for example, Bluetooth, a Radio frequency identification (RFID), an infrared data association (IrDA), an ultra wideband (UWB), Zigbee, and a near field communication (NFC). The communication interface may also refer to any interface, for example, a wired interface, which is capable of communicating with an external source.

Also, the decryptor 120 receives the encrypted target object from the external source through the communication interface.

Figure 2A:
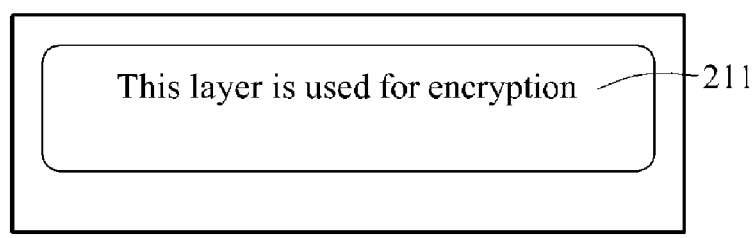
FIGS. 2A through 4C are diagrams illustrating examples of an encryption.
Figure 2B:
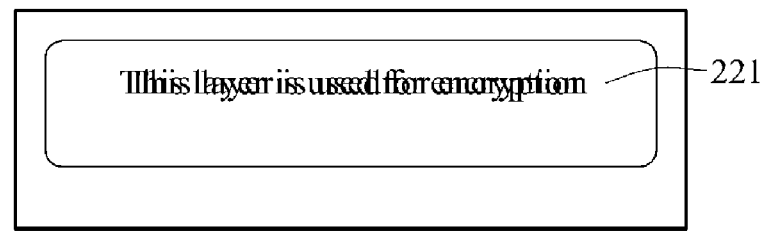

FIGS. 2A through 4C are diagrams illustrating examples of an encryption. Referring to FIGS. 2A and 2B, a security apparatus encrypts a target object 211 based on an overlay scheme. In an example, an encryption may be performed based on an area corresponding to an encryption gesture input by a user. For example, the security apparatus may encrypt the target object 211 by recognizing a touch gesture corresponding to a start area and an end area of the target object 211.

The security apparatus may set a noise object as an identical object to the target object 211 in advance. Alternatively, the user may input the identical object to the target object 211 as the noise object to the security apparatus through an interface. Also, the security apparatus may set whether the target object 211 is to be encrypted based on the overlay scheme among various encryption schemes, in advance. Alternatively, the user may select the overlay scheme from the encryption schemes, and input the overlay scheme to the security apparatus through the interface.

The security apparatus generates an encrypted target object 221 obtained by overlaying the target object 211 with the noise object. In this example, the security apparatus may overlay the target object 211 with the noise object such that a presence of the target object 211 is recognizable in the encrypted target object 221.

Figure 3A:
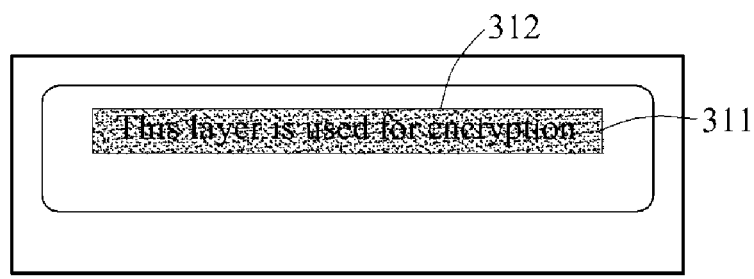
Figure 3B:
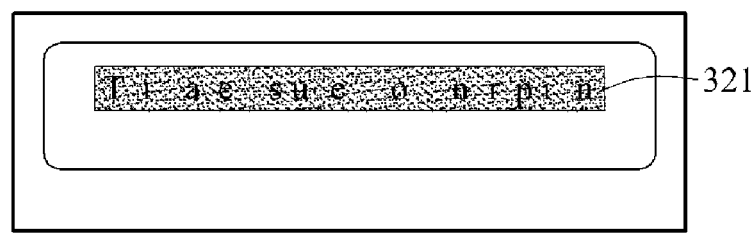
Figure 3C:
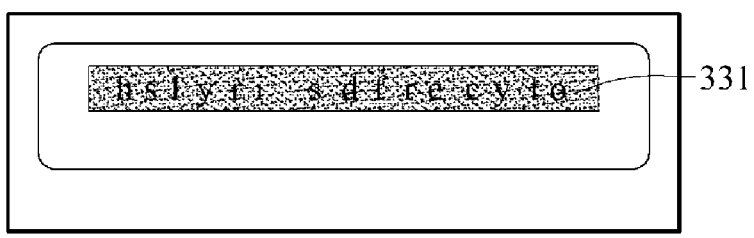

Referring to FIGS. 3A through 3C, a security apparatus encrypts a target object 311 based on a division scheme. In FIG. 3A, the target object 311 is a text, and a noise object 312 is a grayscale image. In this example, the security apparatus may set the noise object 312 as the grayscale image, or the user may input the grayscale image to the security apparatus as the noise object 312. Also, the security apparatus may set whether the target object 311 is to be encrypted, in advance. Alternatively, the user may select the division scheme, and input the division scheme to the security apparatus through an interface.

In FIGS. 3B and 3C, the security apparatus mixes the noise object 312 to the target object 311, and divides a result of the mixing into two groups. In this example, the security apparatus classifies letters including spaces in odd positions into a first group, and classifies letters including spaces in even positions into a second group based on the text of the target object 311. The security apparatus alternately displays objects 321 and 331 included in the two groups on a display. A time for displaying each of the objects 321 and 331 may be set in advance, or set by the user.

Figure 4A:
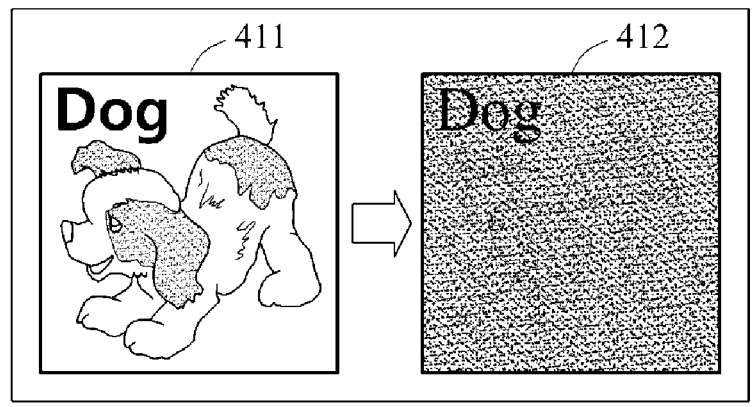

Referring to FIG. 4A, a security apparatus overlays a target object 411 based on an overlay scheme. The security apparatus sets an image having a relatively low brightness as a noise object, and generate an encrypted target object 412 by overlaying the target object 411 with the noise object.

Figure 4B:
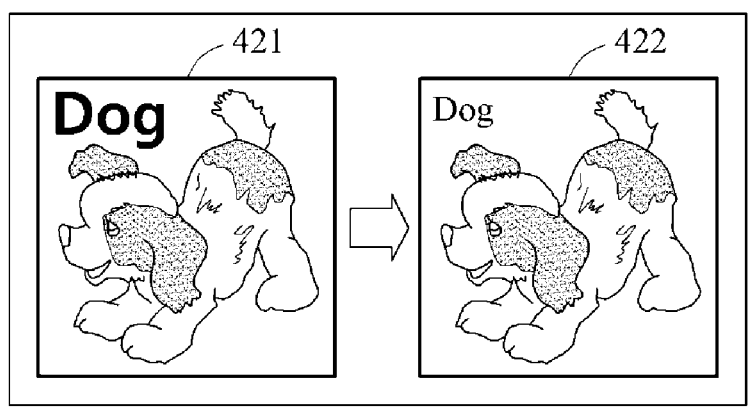

Referring to FIG. 4B, a target object 421 includes a text and an image. The security apparatus encrypts the text of the target object 421. As illustrated in FIG. 4B, the security apparatus generates an encrypted target object 422 by changing a text option, for example, a type, a size, and a boldness of a font, of a text "Dog". Also, the security apparatus may generate the encrypted target object 422 by removing letters "o" and "g" from the text "Dog".

Figure 4C:
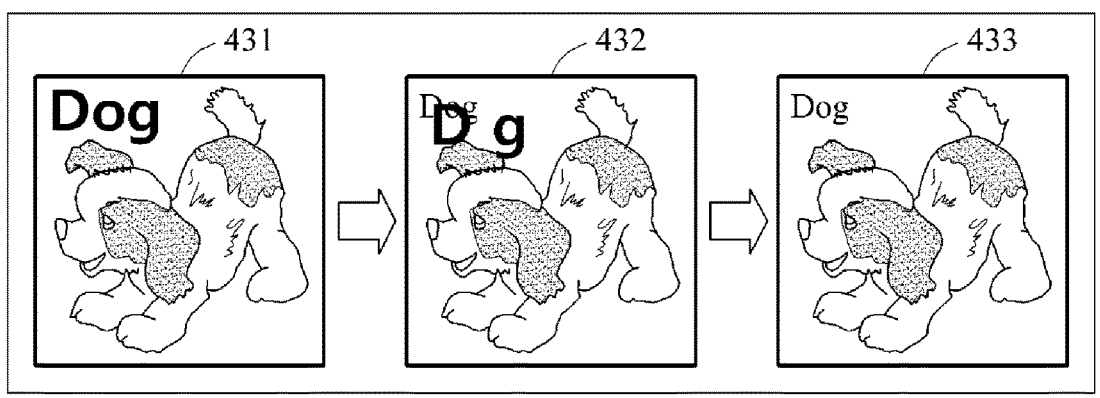

Referring to FIG. 4C, the security apparatus encrypts a target object 431 based on a plurality of schemes. In this example, the plurality of schemes may be set in advance, or input from a user through an interface. In FIG. 4C, the security apparatus performs a first encryption based on an overlay scheme, and then performs a second encryption on an encrypted target object 432 on which the first encryption is performed, based on a removal scheme.

In a process of the first encryption, the security apparatus changes a text option of a text "Dog" included in the target object 431, and generates the encrypted target object 432 by overlaying the target object 431 with a noise object "D g". In a process of the second encryption, the security apparatus removes the noise object "D g" from the encrypted target object 432, thereby generating an encrypted target object 433. In an example, the security apparatus may alternately display the encrypted target object 432 and the encrypted target object 433 on a display.

Figure 5A:
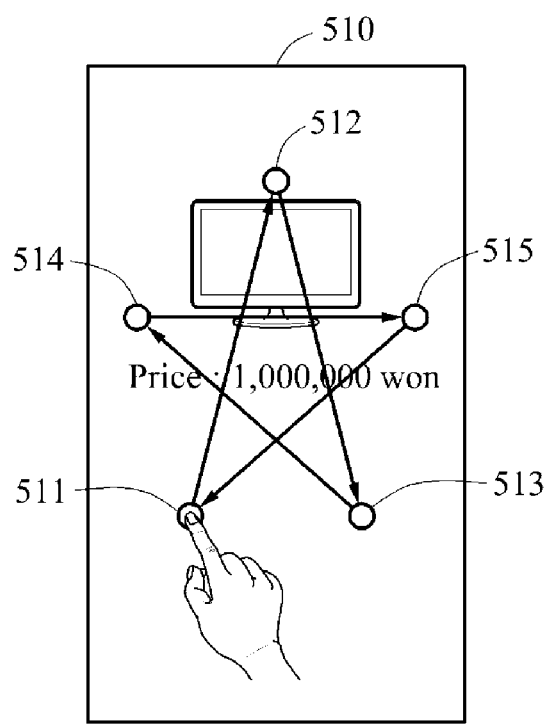
FIGS. 5A and 5B are diagrams illustrating examples of setting an encryption.
Figure 5B:
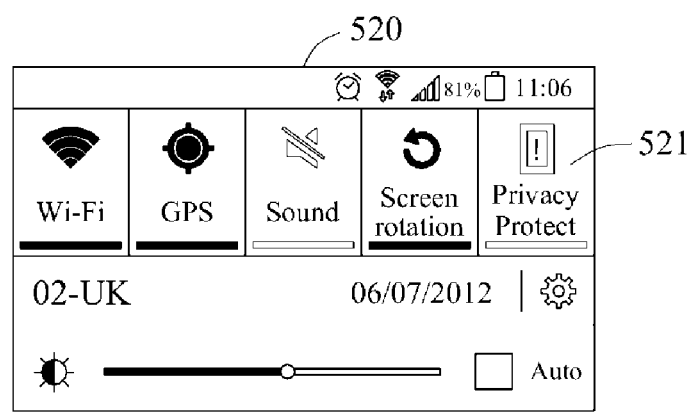

FIGS. 5A and 5B are diagrams illustrating examples of setting an encryption. Referring to FIGS. 5A and 5B, a security apparatus sets an operation mode to an encryption mode. In this example, the encryption mode refers to an operation mode in which the security apparatus encrypts a target object. Also, a normal mode refers to an operation mode in which the security apparatus does not encrypt the target object despite an input of an encryption gesture.

In FIG. 5A, the security apparatus sets the operation mode to the encryption mode based on an encryption gesture input by a user. For example, the user may sequentially touch or slide areas 511 through 515 of a target object 510. The security apparatus may recognize a touch gesture or a slide gesture input by the user as an encryption gesture for setting the operation mode to the encryption mode. The security apparatus may set the operation mode to the encryption mode based on the recognized encryption gesture.

In FIG. 5B, the security apparatus receives a command from a user through an interface 520, and sets the operation mode to the encryption mode. For example, the security apparatus provides the interface 520 to the user. The interface 520 includes an interface 521 used to set the operation mode to the encryption mode. When the user selects the interface 521, the security apparatus sets the operation mode to the encryption mode. When the user revokes the selecting of the interface 521, the security interface sets the operation mode to the normal mode.

Figure 6A:
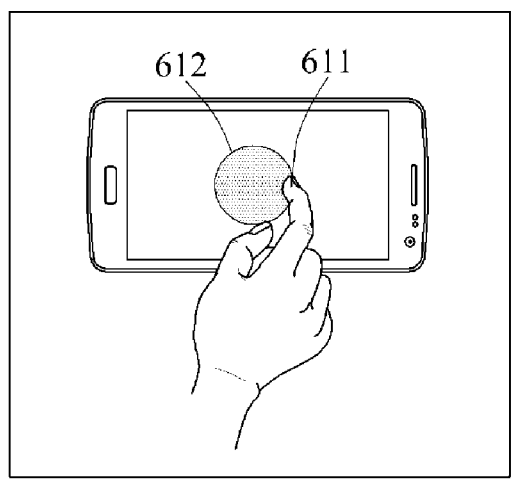
FIGS. 6A and 6B are diagrams illustrating examples of setting an encryption area.
Figure 6B:
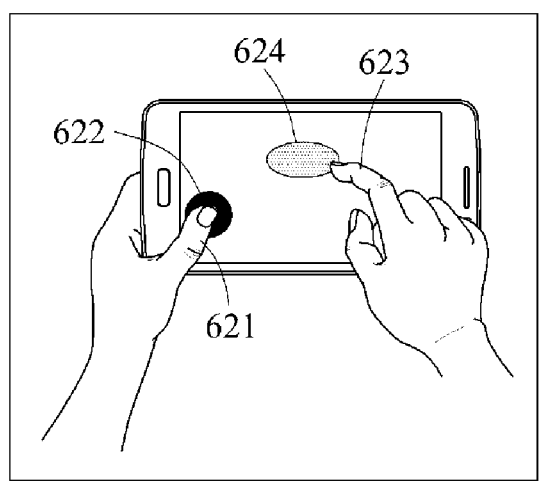

FIGS. 6A and 6B are diagrams illustrating examples of setting an encryption area. Referring to FIGS. 6A and 6B, a security apparatus sets the encryption area. The encryption area refers to an area to be encrypted in a target object.

In an example, the security apparatus determines the encryption area based on an area corresponding to an encryption gesture. In this example, the encryption gesture may include a touch gesture corresponding to at least one area of a target object, a sliding gesture performed on at least one area of the target object, and a drag gesture for setting a range of at least one area in the target object based on two touch gestures. Also, the encryption gesture may include the drag gesture, the sliding gesture, or the touch gesture simultaneously input with a touch gesture corresponding to a predetermined area on a display. The security apparatus may set an area corresponding to the touch gesture, the sliding gesture, and/or the drag gesture as the encryption area.

In FIG. 6A, a user inputs a drag gesture 611 for setting a range of an area 612 in a target object, to the security apparatus. In this example, the security apparatus determines the area 612 set based on the drag gesture 611, as the encryption area.

In FIG. 6B, the security apparatus simultaneously receives a touch gesture 621 and a sliding gesture 623, the touch gesture 621 corresponding to a predetermined area 622 on a display. In this example, the security apparatus determines an area 624 set based on the sliding gesture 623, as the encryption area.

Figure 7:
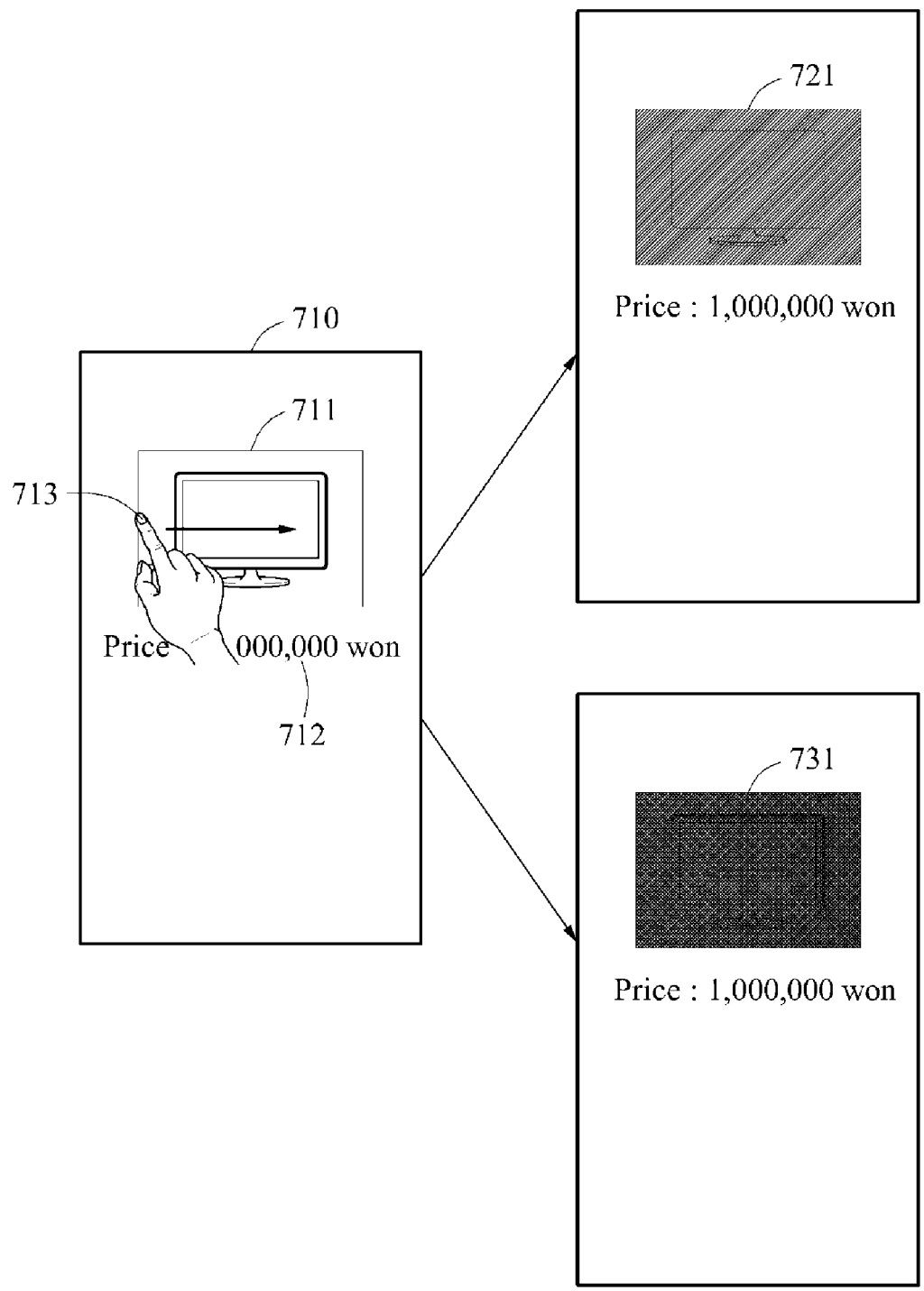
FIGS. 7 through 8C are diagrams illustrating examples of setting an encryption level.
Figure 8A:
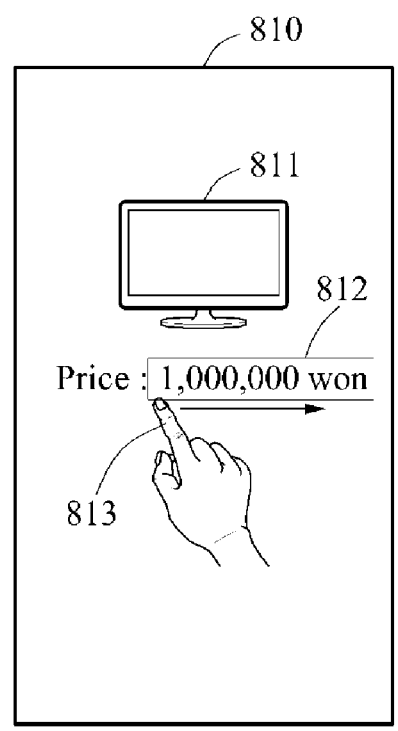
Figure 8B:
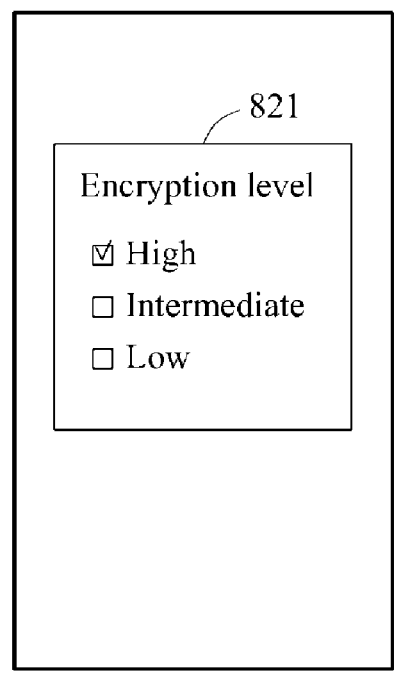
Figure 8C:
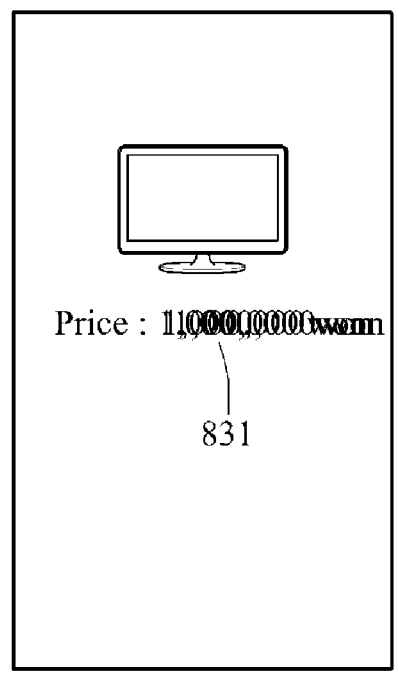

FIGS. 7 through 8C are diagrams illustrating examples of setting an encryption level. Referring to FIG. 7, a target object 710 includes an image 711 and a text 712. A security apparatus adjusts a mixing ratio of a noise object to the target object 710 based on a speed of an encryption gesture for the target object 710.

In an example, the security apparatus receives a sliding gesture 713 input by a user to the image 711 of the target object 710. Based on the sliding gesture 713 input by the user, the security apparatus mixes a noise image to the image 711. In this example, the security apparatus may adjust a mixing ratio of the noise image to the image 711 based on a speed of the sliding gesture 713. For example, when the speed of the sliding gesture 713 is 10 centimeters per second (cm/s), the security apparatus may set a relatively low mixing ratio of the noise image to the image 711 as represented by an encrypted target object 721. When the speed of the sliding gesture is 20 cm/s, the secure apparatus may set a relatively high mixing ratio of the noise image to the image 711 as represented by an encrypted target object 731. Also, in a case in which the speed of the sliding gesture 713 is low, the secure apparatus may set a higher mixing ratio of the noise image to the image 711 as compared to a case in which the speed of the sliding gesture 713 is high.

Referring to FIG. 8A, a target object 810 includes an image 811 and a text 812. A user inputs a mixing ratio of a noise object to the target object 810, to a security apparatus through an interface.

In an example, the security apparatus receives a sliding gesture 813 input by the user to the text 812 of the target object 810. Based on the sliding gesture 813 input by the user, the security apparatus mixes a noise text to the text 812.

Referring to FIG. 8B, the security apparatus provides an interface 821 to the user. The secure apparatus receives the mixing ratio of the noise text to the text 812 from the user through the interface 821, and mixes the noise text to the text 812 based on the mixing ratio received from the user.

Referring to FIG. 8C, when a high mixing ratio of the noise text is input from the user through the interface 821, the secure apparatus mixes the noise text to the text 812 based on the high mixing ratio to generate an encrypted target object 831.

Figure 9A:
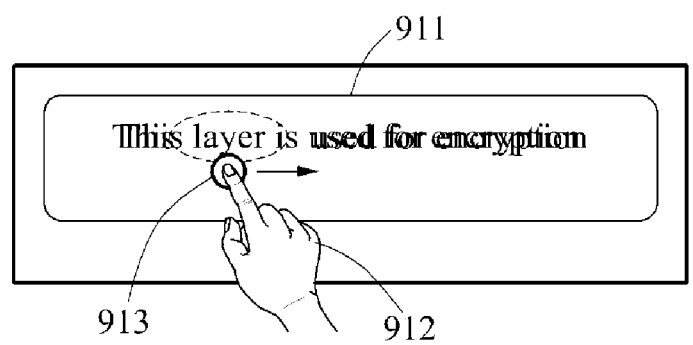
FIGS. 9A through 11 are diagrams illustrating examples of a decryption.
Figure 9B:
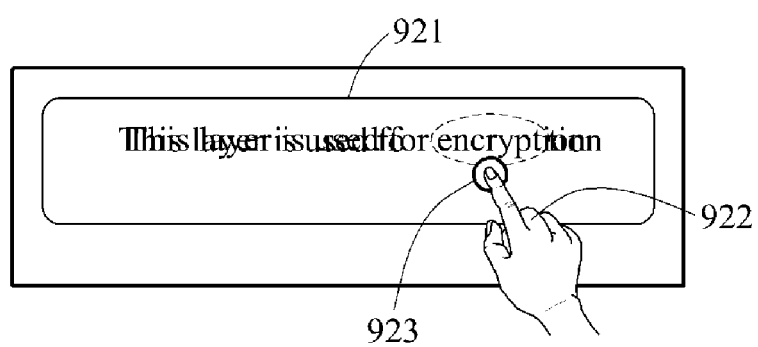

FIGS. 9A through 11 are diagrams illustrating examples of a decryption. Referring to FIGS. 9A and 9B, during a predetermined period of time, a secure apparatus decrypts an area corresponding to a decryption gesture input by a user in an encrypted target object. Subsequently, an encryptor visually encrypts the area corresponding to the decryption gesture when the predetermined period of time elapses.

For example, the secure apparatus receives, from the user, sliding gestures 912 and 922 performed by sliding from an area 913 to an area 923 of an encrypted target text 911. Through this, the secure apparatus decrypts letters from "layer is" of the target text 911 to "encryp" of an encrypted target text 921. In this example, the secure apparatus decrypts "layer is" of the target text 911 at a moment at which the user touches the area 913, and then encrypts "layer is" of the target text 911 again when the user is detached from the area 913. In an example, a period of time during which the decryption is maintained may be set in advance, or input by the user.

Figure 10A:
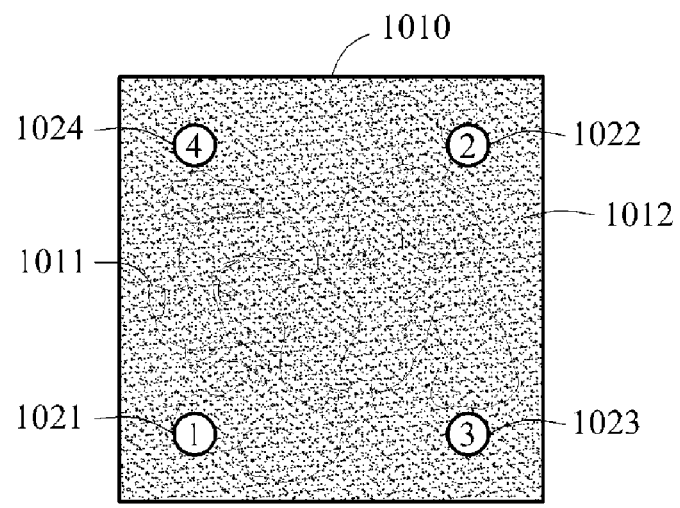
Figure 10B:
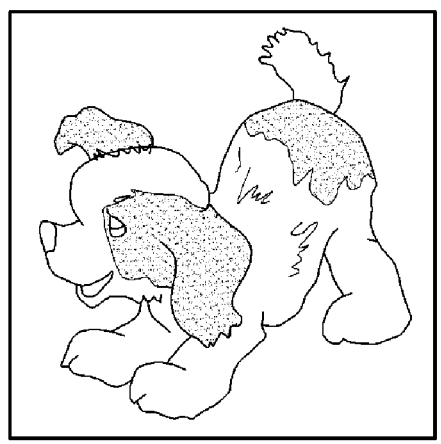

Referring to FIGS. 10A and 10B, the secure apparatus decrypts an entire area of an encrypted target object 1010 based on a decryption gesture. For example, the encrypted target object 1010 is obtained by mixing a noise object 1012 to a target object 1011. The secure apparatus receives consecutive touch gestures corresponding to areas 1021 through 1024 that are input by a user. Based on the input touch gestures, the secure apparatus removes the noise object 1012 from the encrypted target object 1010 as illustrated in FIG. 10B. In this example, the touch gestures corresponding to the areas 1021 through 1024 may be set to decrypt the entire area of the encrypted target object 1010 in advance, or set by the user to decrypt the entire area of the encrypted target object 1010.

Figure 11:
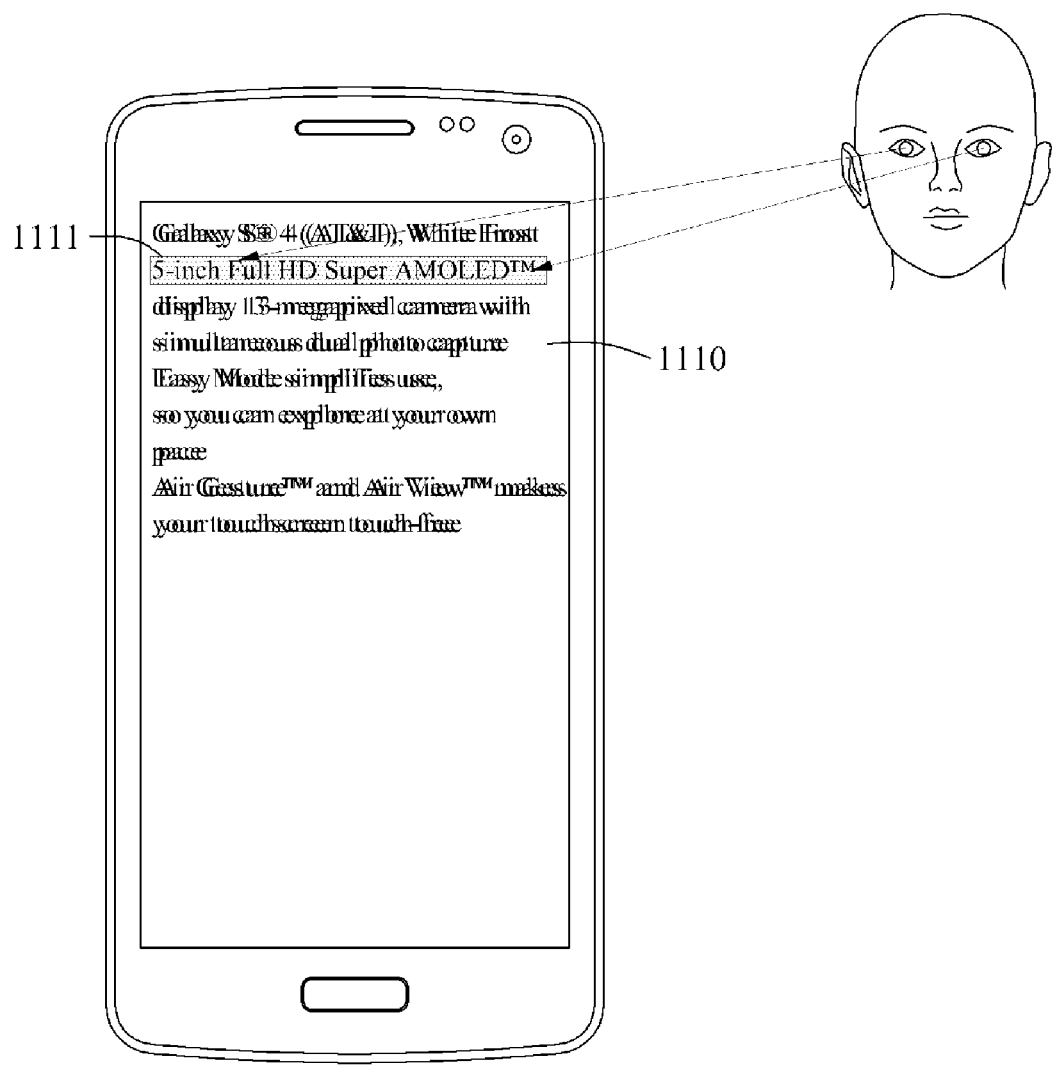

Referring to FIG. 11, the secure apparatus decrypts a target object by recognizing a line of sight of a user. For example, the secure apparatus uses a camera to recognize an area 1111 at which the user gazes at an encrypted target text 1110. The secure apparatus decrypts only the area 1111 of the encrypted target text 1110. In this example, when the user changes a direction of the line of sight, the secure apparatus may decrypt an area at which the user gazes in the changed direction, and then encrypt the area 1111 again.

FIGS. 12A through 12D are diagrams illustrating examples of setting a decryption area. Referring to FIGS. 12A through 12D, a secure apparatus sets a decryption area of an encrypted target object. The decryption area refers to an area to be decrypted In an example, the secure apparatus determines the decryption area based on an area corresponding to a decryption gesture. In this example, the decryption gesture may include a touch gesture corresponding to at least one area of the encrypted target object, a sliding gesture performed on at least one area of the encrypted target object, a drag gesture for setting a range of at least one area in the encrypted target object based on two touch gestures, or a gaze gesture performed by gazing into at least one area of the encrypted target object. Also, the decryption gesture may include the gaze gesture, the drag gesture, the sliding gesture, or the touch gesture simultaneously input with a touch gesture corresponding to a predetermined area.

Figure 12A:
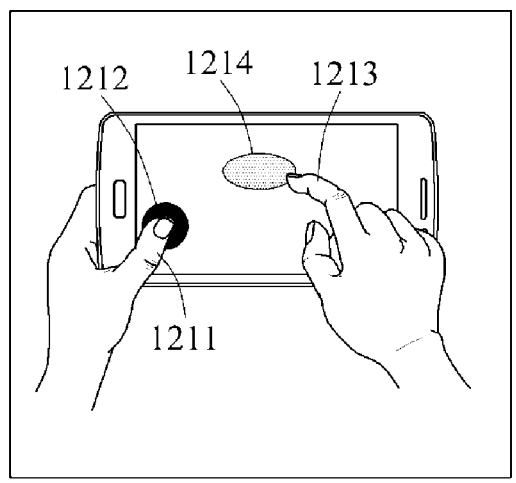
FIGS. 12A through 12D are diagrams illustrating examples of setting a decryption area.
Figure 12B:
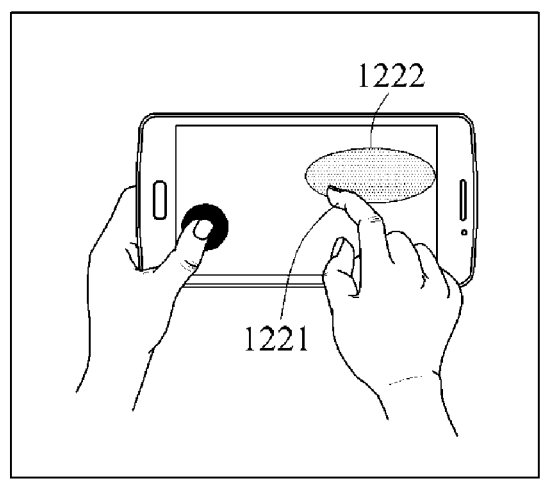

Referring to FIGS. 12A and 12B, the security apparatus simultaneously receives a touch gesture 1211 and a sliding gesture 1213, the touch gesture 1211 being input to a predetermined area 1212 on a display. In this example, the security apparatus determines an area 1214 set based on the sliding gesture 1213 as the decryption area. A user may adjust the area 1214 based on a sliding gesture 1221 such that the security apparatus determines an area 1222 to be the decryption area.

Figure 12C:
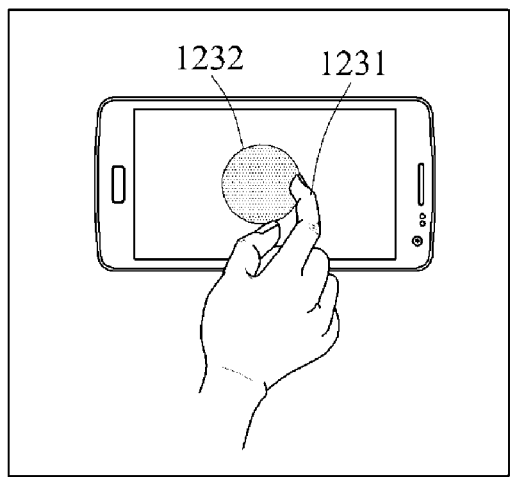
Figure 12D:
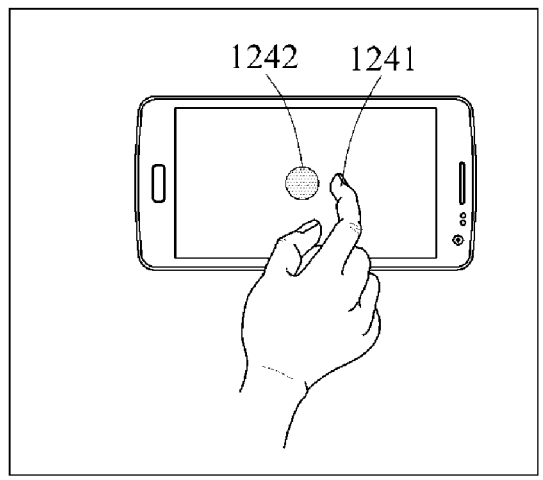

Referring to FIGS. 12C and 12D, the user inputs a drag gesture 1231 for setting a range of an area 1232, to the security apparatus. In this example, the security apparatus determines the area 1232 set based on the drag gesture 1231, as the decryption area. The user adjusts the area 1232 based on a drag gesture 1241 such that the security apparatus determines an area 1242 as the decryption area.

Figure 13:
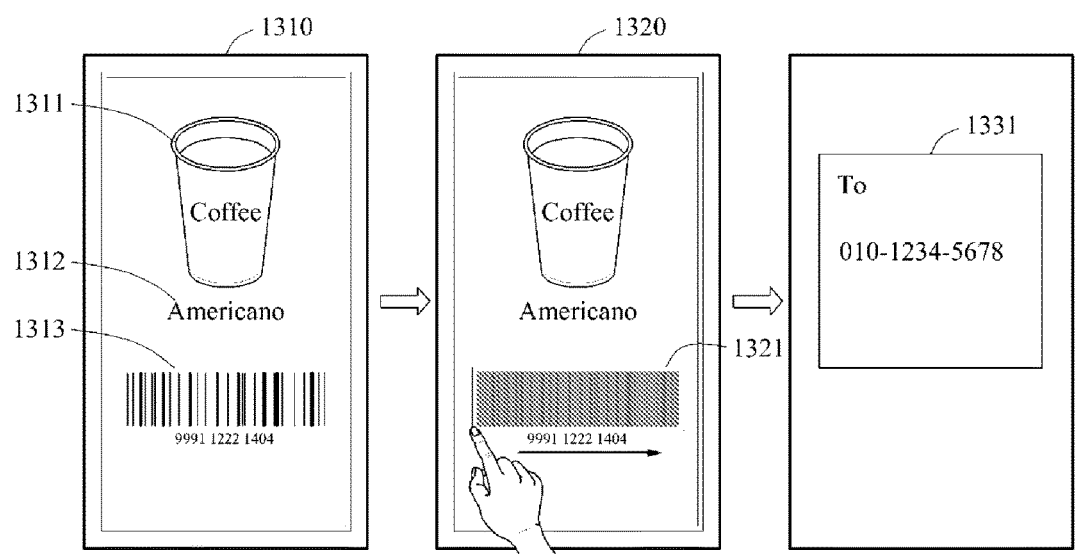
FIGS. 13 and 14 are diagrams illustrating examples of transmitting and receiving an encrypted target object.
Figure 14:
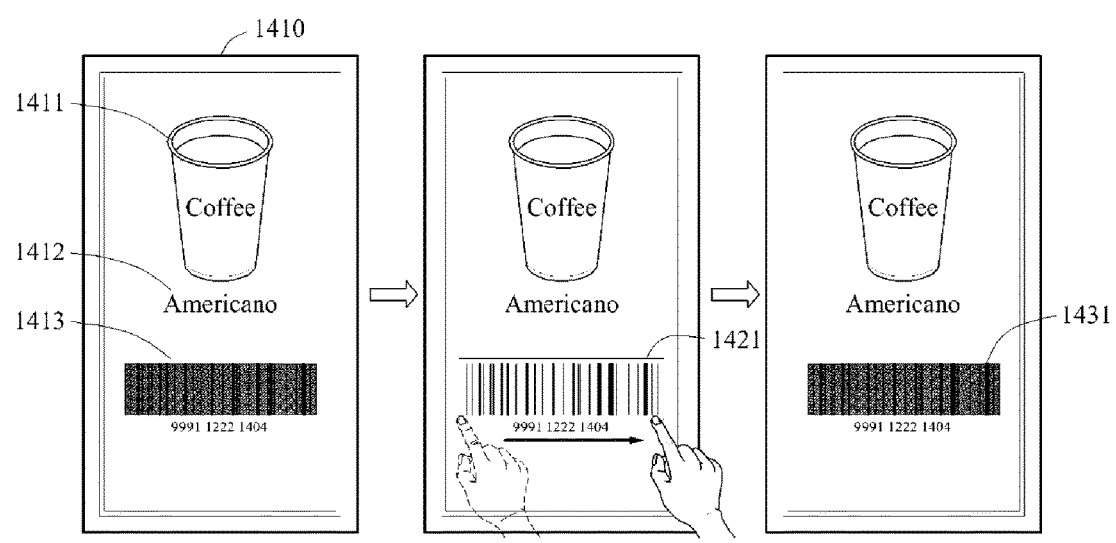

FIGS. 13 and 14 are diagrams illustrating examples of transmitting and receiving an encrypted target object. Referring to FIG. 13, a target object 1310 includes an image 1311, a text 1312, and a barcode 1313. A terminal apparatus displays the target object 1310 on a display. In this example, the terminal apparatus receives a sliding gesture input to the barcode 1313 from a user. In response to the inputting, the terminal apparatus encrypts the target object 1310 by mixing a noise object 1321 to the barcode 1313 to generate an encrypted target object 1320. The terminal apparatus provides the user with an interface 1331 for transmitting the encrypted target object 1320 to an external terminal. Through the interface 1331, the terminal apparatus receives information of the external terminal to which the encrypted target object 1320 is to be transmitted, from the user. By using the interface 1331, the terminal apparatus may transmit the encrypted target object 1320 to the external terminal based on the information received from the user.

Referring to FIG. 14, the terminal apparatus receives an encrypted target object 1410 from an external terminal through a communication interface. The encrypted target object 1410 includes an image 1411, a text 1412, and an encrypted barcode 1413. The terminal apparatus receives a sliding gesture input to the encrypted barcode 1413 from a user. In response to the receiving, the terminal apparatus generates a barcode 1421 by decrypting the encrypted barcode 1413 during a predetermined period of time. When the predetermined period of time elapses, the terminal apparatus encrypts the barcode 1421, thereby generating an encrypted barcode 1431. In an example, a period of time during which the terminal apparatus decrypts the encrypted barcode 1413 may be set by the terminal apparatus in advance, or set by the user. The period of time may also be set in advance by the external terminal from which the encrypted target object 1410 is received.

Figure 15:
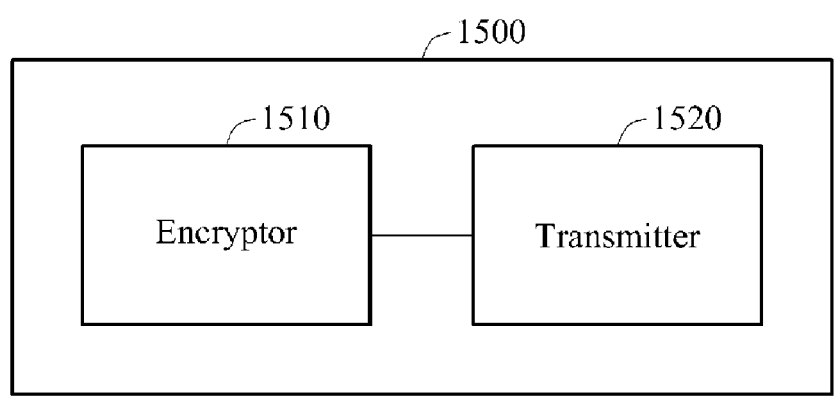
FIG. 15 is a block diagram illustrating an example of a terminal apparatus.

FIG. 15 is a block diagram illustrating an example of a terminal apparatus 1500. Referring to FIG. 15, the terminal apparatus 1500 includes an encryptor 1510 and a transmitter 1520.

The encryptor 1510 may partially or fully visually encrypts a target object. In this example, the encrypted target object may be decrypted during a predetermined period of time based on a decryption gesture input by a user.

Also, the encryptor 1510 may visually encrypt an entirety or a portion of the target object by mixing a noise object to the entirety or the portion of the target object. Also, the encryptor 1510 may visually encrypt the entirety or the portion of the target object based on an encryption gesture input by the user to at least a portion of the target object.

The transmitter 1520 transmits the encrypted target object to an external source through a communication interface.

Since the descriptions provided with reference to FIGS. 1 through 14 are also applicable here, repeated descriptions with respect to the terminal apparatus 1500 of FIG. 15 will be omitted for increased clarity and conciseness.

Figure 16:
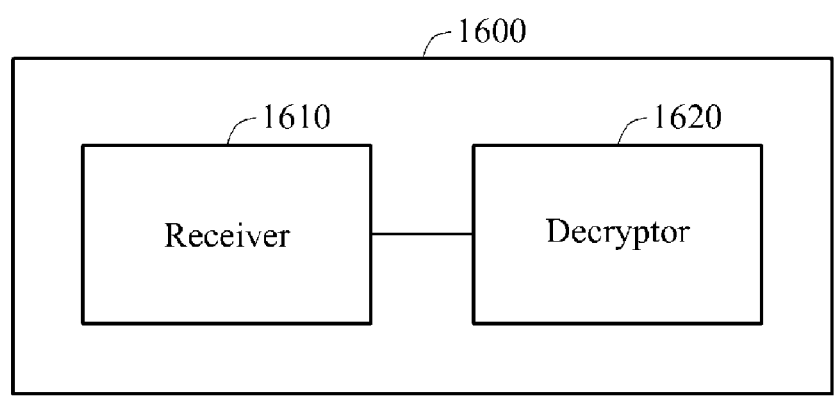
FIG. 16 is a block diagram illustrating another example of a terminal apparatus.

FIG. 16 is a block diagram illustrating an example of a terminal apparatus 1600. Referring to FIG. 16, the terminal apparatus 1600 includes a receiver 1610 and a decryptor 1620.

The receiver 1610 receives an encrypted target object from an external source through a communication interface.

The decryptor 1620 decrypts an area corresponding to a decryption gesture input by the user in the encrypted target object during a predetermined period of time.

Since the descriptions provided with reference to FIGS. 1 through 14 are also applicable here, repeated descriptions with respect to the terminal apparatus 1600 of FIG. 16 will be omitted for increased clarity and conciseness.

Figure 17:
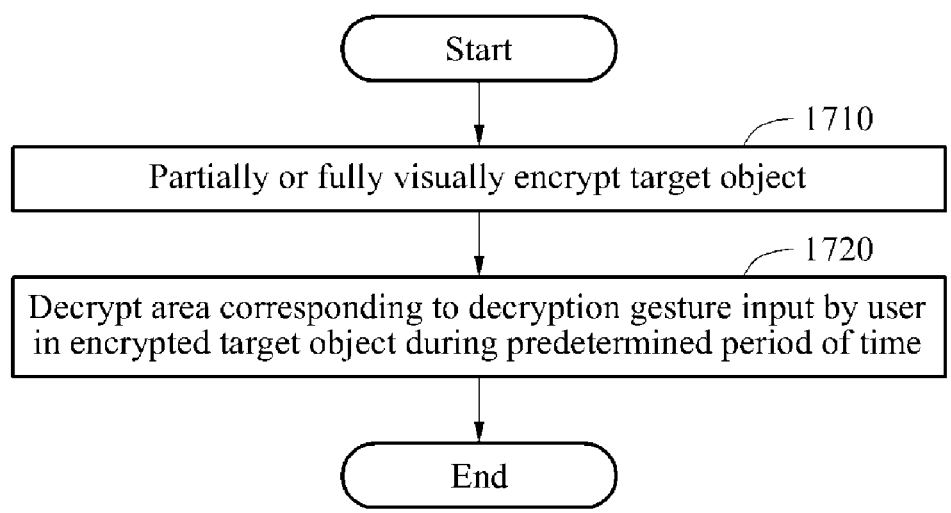
FIG. 17 is a flowchart illustrating an example of a security method.

FIG. 17 is a flowchart illustrating an example of a security method. Referring to FIG. 17, in operation 1710, a security apparatus partially or fully visually encrypts a target object.

In operation 1720, the security apparatus decrypts an area corresponding to a decryption gesture input by a user in the encrypted target object during a predetermined period of time.

Since the descriptions provided with reference to FIGS. 1 through 14 are also applicable here, repeated descriptions with respect to the security method of FIG. 17 will be omitted for increased clarity and conciseness.

Figure 18:
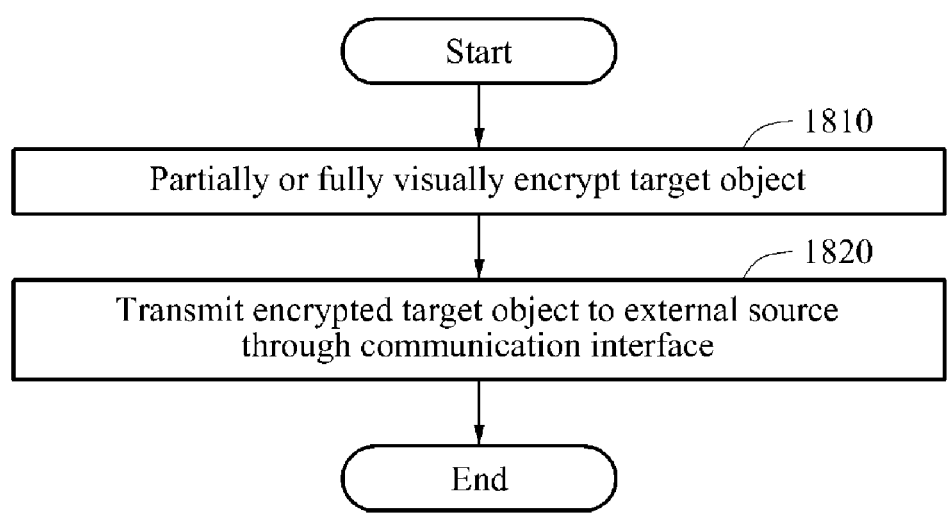
FIG. 18 is a flowchart illustrating an example of a terminal apparatus control method.

FIG. 18 is a flowchart illustrating an example of a terminal apparatus control method. Referring to FIG. 18, in operation 1810, a terminal apparatus partially or fully visually encrypts a target object. In this example, the encrypted target object may be decrypted during a predetermined period of time based on a decryption gesture input by a user.

In operation 1820, the terminal apparatus transmits the encrypted target object to an external source through a communication interface.

Since descriptions provided with reference to FIGS. 1 through 14 are also applicable here, repeated descriptions with respect to the terminal apparatus control method of FIG. 18 will be omitted for increased clarity and conciseness.

Figure 19:
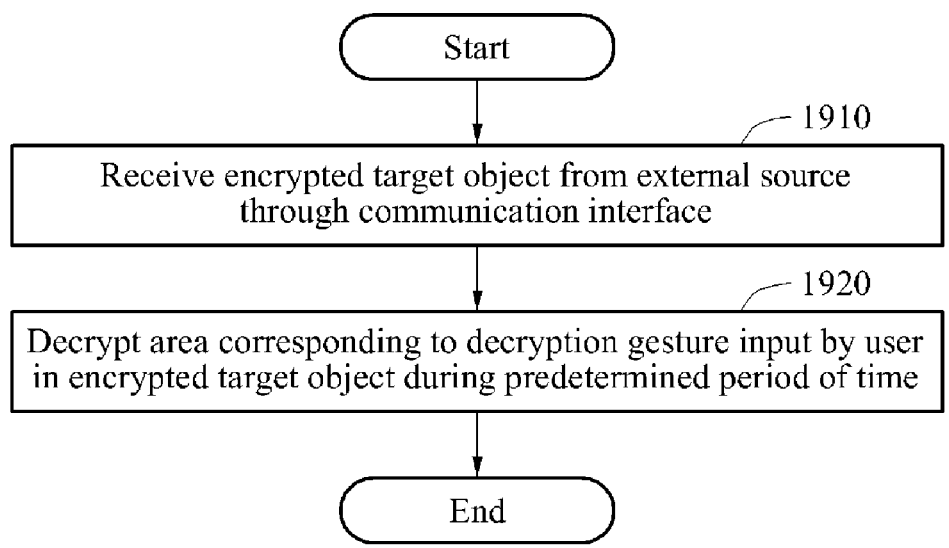
FIG. 19 is a flowchart illustrating another example of a terminal apparatus control method.

FIG. 19 is a flowchart illustrating another example of a terminal apparatus control method. Referring to FIG. 19, in operation 1910, a terminal apparatus receives an encrypted target object from an external source through a communication interface.

In operation 1920, the terminal apparatus decrypts an area corresponding to a decryption gesture input by a user in the encrypted target object during a predetermined period of time.

Since descriptions provided with reference to FIGS. 1 through 14 are also applicable here, repeated descriptions with respect to the terminal apparatus control method of FIG. 19 will be omitted for increased clarity and conciseness.

The various elements and methods described above may be implemented using one or more hardware components, or a combination of one or more hardware components and one or more software components.

A hardware component may be, for example, a physical device that physically performs one or more operations, but is not limited thereto. Examples of hardware components include microphones, amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

As a non-exhaustive illustration only, a terminal described herein may refer to mobile devices such as, for example, a cellular phone, a smart phone, a wearable smart device (such as, for example, a ring, a watch, a pair of glasses, a bracelet, an ankle bracket, a belt, a necklace, an earring, a headband, a helmet, a device embedded in the cloths or the like), a personal computer (PC), a tablet personal computer (tablet), a phablet, a personal digital assistant (PDA), a digital camera, a portable game console, an MP3 player, a portable/personal multimedia player (PMP), a handheld e-book, an ultra mobile personal computer (UMPC), a portable lab-top PC, a global positioning system (GPS) navigation, and devices such as a high definition television (HDTV), an optical disc player, a DVD player, a Blue-ray player, a setup box, or any other device capable of wireless communication or network communication consistent with that disclosed herein. In a non-exhaustive example, the wearable device may be self-mountable on the body of the user, such as, for example, the glasses or the bracelet. In another non-exhaustive example, the wearable device may be mounted on the body of the user through an attaching device, such as, for example, attaching a smart phone or a tablet to the arm of a user using an armband, or hanging the wearable device around the neck of a user using a lanyard.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A security apparatus comprising:
   an encryptor configured to
      set a mode of the security apparatus to be an encryption mode, in which encryption gestures are recognized, or a normal mode, in which encryption gestures are not recognized,
      receive, from a user, an encryption gesture directed to a target object,
      determine whether the security apparatus is in the encryption mode or the normal mode,
      upon determining that the security apparatus is in the normal mode, ignore the encryption gesture, and
      upon determining that the security apparatus is in the encryption mode, visually encrypt the target object according to the encryption gesture; and
   a decryptor configured to
      detect an input decryption gesture indicating an area in the encrypted target object, and
      decrypt the area for a length of time, wherein the length of time is based on a speed of the decryption gesture, wherein the encryptor is further configured to, upon expiration of the length of time, re-encrypt the decrypted area.

2. The apparatus of claim 1, wherein the encryptor is configured to:
visually encrypt an area corresponding to the encryption gesture in the target object.

3. The apparatus of claim 1, wherein the encryptor is configured to:
recognize, as the encryption gesture, any one or any combination of a touch gesture to an area in the target object, a sliding gesture to an area in the target object, and a drag gesture for setting a range of an area in the target object based on two touch gestures.

4. The apparatus of claim 3, wherein the encryptor is configured to:
recognize, as the encryption gesture, the drag gesture, the sliding gesture, or the touch gesture simultaneously input with a touch gesture to a predetermined area on a display.

5. The apparatus of claim 1, wherein the encryptor is configured to:
mix a noise object to the target object to visually encrypt the target object.

6. The apparatus of claim 5, wherein the encryptor is configured to:
adjust a mixing ratio of the noise object to the target object based on a speed of the encryption gesture to the target object.

7. The apparatus of claim 5, wherein the encryptor is configured to:
mix the noise object to the target object such that a presence of the target object is recognizable in the encrypted target object.

8. The apparatus of claim 1, wherein the encryptor is configured to:
receive any one or any combination of an area to be visually encrypted in the target object, a noise object to be mixed to the target object, and a mixing ratio of the noise object to the target object.

9. The apparatus of claim 1, wherein the encryptor is configured to:
overlay the target object with a noise object to visually encrypt the target object.

10. The apparatus of claim 1, wherein the encryptor is configured to:
divide the target object into groups; and
alternately display the groups to visually encrypt the target object.

11. The apparatus of claim 1, wherein the decryptor is configured to:
receive either one or both of the length of time and a range of the area corresponding to the decryption gesture.

12. The apparatus of claim 1, wherein the decryptor is configured to:
set the area corresponding to the decryption gesture as an entire area of the encrypted target object.

13. The apparatus of claim 1, wherein the decryptor is configured to:
recognize, as the decryption gesture, any one or any combination of a gaze gesture into the area in the encrypted target object, a drag gesture for setting a range of the area in the encrypted target object based on two touch gestures, a sliding gesture to the area in the encrypted target object, and a touch gesture to the area in the encrypted target object.

14. The apparatus of claim 13, wherein the decryptor is configured to:
recognize, as the decryption gesture, the gaze gesture, the drag gesture, the sliding gesture, or the touch gesture simultaneously input with a touch gesture to a predetermined area on a display.

15. The apparatus of claim 1, wherein the target object comprises any one or any combination of an image, a text, and a video that are displayed on a display.

16. The apparatus of claim 1, wherein:
the encryptor is configured to transmit the encrypted target object to another device; and
the decryptor is configured to receive the encrypted target object from the other device.

17. The apparatus of claim 1, wherein the decryptor is configured to:
adjust the length of time based on the speed of the decryption gesture.

18. The apparatus of claim 1, wherein the length of time is input from the user or is set in advance to be a predetermined value.

19. A terminal device comprising:
an encryptor configured to visually encrypt a target object by mixing a noise object to the target object, wherein a mixing ratio of the noise object to the target object is adjusted based on a speed of an encryption gesture directed to the target object; and
a transmitter configured to transmit the encrypted target object to another device,
wherein the encrypted target object is decrypted for a length of time based on a speed of a decryption gesture, and
wherein, upon expiration of the length of time, the decrypted target object is re-encrypted.

20. A terminal device comprising:
a receiver configured to receive an encrypted target object from another device; and
a decryptor configured to
detect an input decryption gesture indicating an area in the encrypted target object,
wherein the decryption gesture is detected when one of a gaze gesture, a drag gesture, a sliding gesture, or a touch gesture is input simultaneously with a continuous touch gesture to a predetermined area on a display of the terminal device, and
decrypt the area for a length of time, wherein the length of time is based on a speed of the decryption gesture,
wherein, upon expiration of the length of time, the decrypted area is re-encrypted.

21. A security method comprising:
setting a mode of a security apparatus to be an encryption mode, in which encryption gestures are recognized, or a normal mode, in which encryption gestures are not recognized;
receiving, from a user, an encryption gesture directed to an object displayed on a display;
determining whether the security apparatus is in the encryption mode or the normal mode;
upon determining that the security apparatus is in the moral mode, ignoring the encryption gesture;
upon determining that the security apparatus is in the encryption mode, visually encrypting the object based on the encryption gesture to the object;
decrypting the encrypted object based on a decryption gesture to the encrypted object for a length of time, wherein the length of time is based on a speed of the decryption gesture; and upon expiration of the length of time, re-encrypting the decrypted object.

22. The security method of claim 21, wherein the decrypting comprises:
    decrypting an area corresponding to the decryption gesture in the encrypted object, during the length of time.

* * * * *